A. D. MORRIS.
METALLIC PACKING FOR PISTON AND OTHER RODS.
APPLICATION FILED APR. 28, 1916.
1,309,075.
Patented July 8, 1919.
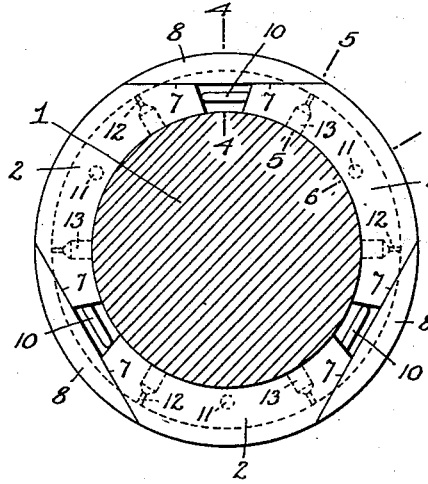
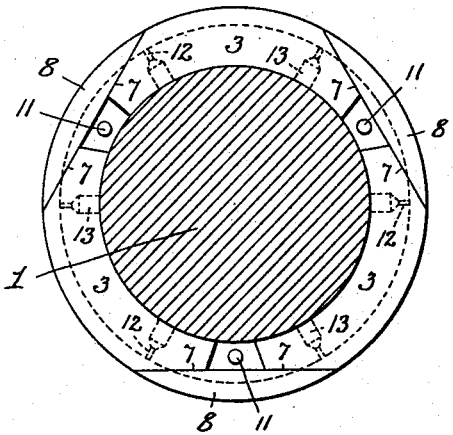
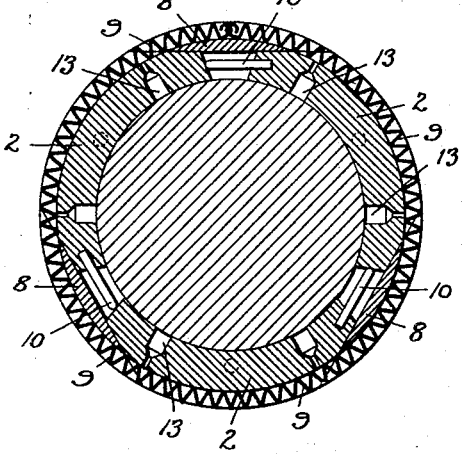
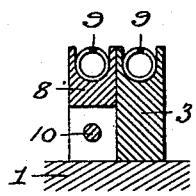
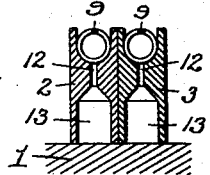
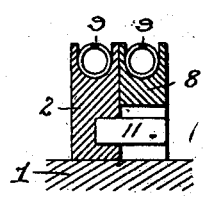
INVENTOR
ALFRED D. MORRIS
BY HIS ATTORNEY
Harry Smith

UNITED STATES PATENT OFFICE.

ALFRED D. MORRIS, OF PHILADELPHIA, PENNSYLVANIA, ASSIGNOR TO MORRIS METALLIC PACKING COMPANY, OF PHILADELPHIA, PENNSYLVANIA, A CORPORATION OF PENNSYLVANIA.

METALLIC PACKING FOR PISTON AND OTHER RODS.

1,309,075.  Specification of Letters Patent.  Patented July 8, 1919.

Application filed April 28, 1916. Serial No. 94,128.

*To all whom it may concern:*

Be it known that I, ALFRED D. MORRIS, a subject of the King of Great Britain, residing in Philadelphia, Pennsylvania, have invented certain Improvements in Metallic Packings for Piston and other Rods, of which the following is a specification.

My invention relates to that type of rod packings in which the packing rings are composed of segments constantly pressed toward the rod and having gaps between them which, as the segments wear, gradually decrease in width, the objects of my invention being, first, to permit of the maximum amount of wear of the sections before the packing has to be discarded, second, to preserve the proper circumferential relation of the segments to one another at all times, and third, to reduce the wear of the inner faces of the segments caused by contact of the rod due to pressure of the motive fluid upon the outer faces of the segments.

These objects I attain in the manner hereinafter set forth, reference being had to the accompanying drawing, in which—

Figure 1 is a sectional view of a rod and a face view of the packing therefor constructed in accordance with my invention;

Fig. 2 is a similar view but showing an opposite face of the packing;

Fig. 3 is a sectional view passing through both rod and packing rings;

Fig. 4 is a transverse section on the line 4—4, Fig. 1;

Fig. 5 is a transverse section on the line 5—5, Fig. 1; and

Fig. 6 is a transverse section on the line 6—6, Fig. 1;

Figs. 4, 5 and 6 are on a larger scale than Figs. 1, 2 and 3.

In the drawing 1 represents a rod to which the packing is applied, the packing in the present instance being composed of two rings, each consisting of three segments, with gaps between them, the segments of one ring being represented at 2, and those of the other ring at 3, and the outer face of each ring being ground off at each end, as shown at 7, so as to provide a seat for the corresponding end of a bridge piece 8 which crosses the gap between adjoining segments and thus serves to provide a continuous bearing for the contractile member 9 which extends completely around the packing ring and is contained within grooved seats in the ring segments and bridge pieces, said contractile member consisting in the present instance of a coiled spring of the proper length bent into annular form and having its meeting ends connected, as shown in Fig. 3.

As the inner faces of the ring segments wear the ends of the segments approach one another and in order to prevent them from contacting with one another and thereby preventing further inward movement of the segments before the inner faces of the latter have been worn away to the desired extent the ends of each segment are flared backwardly from the inner to the outer face of the segment, as shown in Figs. 1, 2 and 3.

In order to maintain the ring segments in their proper circumferential relation to one another around the rod, spacing pins are provided in each gas between adjoining segments, the spacing pins 10 employed in connection with one ring being each carried by one end of one segment and projecting longitudinally across the gap toward the opposed end of the adjoining segment, as shown in Figs. 1, 3 and 4, and the spacing pins 11 of the other ring projecting laterally into the gaps between the segments of said ring from a mid position on the companion ring, as shown in Figs. 2 and 6.

A close approach of the ring segments as their inner faces wear away is permitted as these spacing pins 10 and 11 gradually wear and are automatically reduced in length or in width as the wear of the segments continues.

In order to provide for the internal cushioning of each ring segment for the purpose of preventing the external pressure of the motive fluid from causing the inner face of said segment to bear with such force upon the rod as to cause excessive wear of said inner face, each segment has formed therein any desired number of radial passages 12 which are expanded at their inner ends, as shown at 13 in Fig. 5, these passages serving for flow of motive fluid from the outer to the inner face of each ring, and the expansion in diameter of the inner end of the passage serving to form inwardly facing shoulders between said ends in order to cause an outward pressure of the motive fluid upon this particular portion of the segment and thus counteract in a measure the external pressure of said motive fluid thereupon.

I claim:

A rod packing ring composed of segments with intervening gaps, means for pressing said segments toward the rod, and spacing pins disposed in said gaps and serving to retain the segments in proper circumferential relation to one another, said spacing pins projecting across the gaps from the end of one segment toward the opposed end of the adjoining segment and being free from connection with one of said segments.

In testimony whereof, I have signed my name to this specification, in the presence of two subscribing witnesses.

ALFRED D. MORRIS.

Witnesses:
KATE A. BEADLE,
HAMILTON D. TURNER.

Copies of this patent may be obtained for five cents each, by addressing the "Commissioner of Patents, Washington, D. C."